(12) United States Patent
Yang et al.

(10) Patent No.: US 12,434,990 B2
(45) Date of Patent: Oct. 7, 2025

(54) SEWAGE TREATMENT DEVICE AND METHOD FOR THERMAL DESORPTION SYSTEM

(71) Applicant: GUANGDONG UNIVERSITY OF TECHNOLOGY, Guangzhou (CN)

(72) Inventors: Yan Yang, Guangzhou (CN); Haojia Chen, Guangzhou (CN)

(73) Assignee: GUANGDONG UNIVERSITY OF TECHNOLOGY, Guangzhou (CN)

(*) Notice: Subject to any disclaimer, the term of this patent is extended or adjusted under 35 U.S.C. 154(b) by 400 days.

(21) Appl. No.: 18/166,402

(22) Filed: Feb. 8, 2023

(65) Prior Publication Data
US 2023/0278903 A1 Sep. 7, 2023

(30) Foreign Application Priority Data
Mar. 2, 2022 (CN) .......................... 202210194865.0

(51) Int. Cl.
*C02F 9/00* (2023.01)
*B01D 21/00* (2006.01)
(Continued)

(52) U.S. Cl.
CPC ............ *C02F 9/00* (2013.01); *B01D 21/0006* (2013.01); *B01D 21/0039* (2013.01);
(Continued)

(58) Field of Classification Search
None
See application file for complete search history.

(56) References Cited

U.S. PATENT DOCUMENTS 5,230,167 A    7/1993  Lahoda et al.
6,808,621 B1 * 10/2004  Cisneros .................. C01D 1/04
                                                       208/299
(Continued)

FOREIGN PATENT DOCUMENTS

CN    106031898 A    10/2016
CN    107685072 A     2/2018
(Continued)

OTHER PUBLICATIONS

Zhongguo Huanjing Baohu Biaozhun Quanshu 2007-2008, part 2, Department of Science, Technology and Standards, Ministry of Environmental Protection, China Environmental Science Press, Dec. 31, 2008, pp. 1746.
(Continued)

*Primary Examiner* — Richard C Gurtowski

(57) ABSTRACT

The disclosure provides a sewage treatment device and method for a thermal desorption system. The device comprises the thermal desorption system and a sewage treatment assembly connected with the thermal desorption system. The sewage treatment assembly comprises a particle precipitation tank for removing large particle suspended matters in sewage, a chemical purification tank for removing organic mattes in sewage and a filter tank for removing fine suspended matters in sewage, which are connected in turn, the particle precipitation tank comprises a stirring cavity provided with a stirring mechanism and a contaminant collection cavity, and the stirring mechanism comprises a stirring shaft provided with several groups of stirring blades along a length direction and a first motor driving the stirring shaft to rotate.

1 Claim, 10 Drawing Sheets

(51) Int. Cl.
    *B01F 27/191*     (2022.01)
    *B01F 27/90*     (2022.01)
    *B01F 35/10*     (2022.01)
    *B09C 1/00*     (2006.01)
    *B09C 1/06*     (2006.01)
    *C02F 1/00*     (2023.01)
    *B01F 101/00*     (2022.01)
    *C02F 1/68*     (2023.01)
    *C02F 101/30*     (2006.01)
    *C02F 103/06*     (2006.01)

(52) U.S. Cl.
    CPC ........ *B01D 21/0087* (2013.01); *B01F 27/191* (2022.01); *B01F 27/90* (2022.01); *B01F 35/1452* (2022.01); *B09C 1/002* (2013.01); *B09C 1/06* (2013.01); *C02F 1/008* (2013.01); *B01F 2101/305* (2022.01); *B09C 2101/00* (2013.01); *C02F 1/004* (2013.01); *C02F 2001/007* (2013.01); *C02F 1/68* (2013.01); *C02F 2101/30* (2013.01); *C02F 2103/06* (2013.01); *C02F 2209/02* (2013.01); *C02F 2209/42* (2013.01)

(56) References Cited

U.S. PATENT DOCUMENTS

2002/0158014 A1\* 10/2002 Yamasaki ............ B01D 61/146
                                                                                       210/651
2021/0179464 A1\* 6/2021 Niu ........................ C02F 1/44

FOREIGN PATENT DOCUMENTS

| CN | 209307101 A | 8/2019 |
|---|---|---|
| CN | 112759013 A | 5/2021 |

OTHER PUBLICATIONS

Nie Xunzai et al., "Practical Handbook of Non-Wood Fiber Papermaking", China Light Industry Press, Jan. 31, 1999, pp. 517.

\* cited by examiner

SEWAGE TREATMENT DEVICE AND METHOD FOR THERMAL DESORPTION SYSTEM

CROSS REFERENCE TO RELATED APPLICATIONS

This application claims foreign priority of Chinese Patent Application No. 202210194865.0, filed on Mar. 2, 2022 in the China National Intellectual Property Administration, the disclosures of all of which are hereby incorporated by reference.

TECHNICAL FIELD

The disclosure relates to the field of sewage treatment equipment, particularly to a sewage treatment device and method for a thermal desorption system.

BACKGROUND OF THE PRESENT INVENTION

A thermal desorption technology is a technology that heat energy is input into soil so as to heat soil and underground water, improve the vapor pressure and solubility of a target contaminant, promote the volatilization or dissolution of the contaminant, and achieve the removal of the target contaminant through soil vapor extraction or multi-phase extraction. The thermal desorption technology is divided into an in-situ repair technology and an ectopic repair technology. The in-situ repair technology refers to on-site disposal of contaminants in contaminated sites; the ectopic repair technology refers to treatment of excavated soil. The in-situ thermal desorption technology is mainly divided into thermal conduction heating, resistance heating, steam heating, etc according to the characteristic of heating. The steam heating is an in-situ thermal desorption technology that is used for injecting high-temperature water vapor into a contaminated area to heat soil and underground water. The water vapor with contaminants is extracted by an extraction well and then undergoes water-vapor separation, subsequently the sewage is treated to be transformed into qualified clean water, and then the clean water is discharged or reused. Therefore, the disclosure provides a sewage treatment device and method for a thermal desorption system.

SUMMARY OF PRESENT INVENTION

To overcome the defects in the prior art, the disclosure provides a sewage treatment device and method for a thermal desorption system.

To achieve the above objective, the disclosure adopts the following technical solution: provided is a control method of a sewage treatment device for a thermal desorption system, wherein the sewage treatment device for the thermal desorption system comprises the thermal desorption system and a sewage treatment assembly connected with the thermal desorption system;

the sewage treatment assembly comprises a particle precipitation tank for removing large particle suspended matters in sewage, a chemical purification tank for removing organic mattes in sewage and a filter tank for removing fine suspended matters in sewage, which are connected in turn;

the particle precipitation tank comprises a stirring cavity provided with a stirring mechanism and a contaminant collection cavity, and the stirring mechanism comprises a stirring shaft provided with several groups of stirring blades along a length direction and a first motor driving the stirring shaft to rotate, the several groups of stirring blades are unequal in length, the upper and lower sides of the several groups of stirring blades are provided with several water barrier columns, and the water barrier columns are provided with several limbers;

the chemical purification tank comprises a purification cavity, the top of the chemical purification tank is provided with a chemical agent storage box in which several chemical agent storage bottles are arranged, the chemical agent storage bottles are matched and connected with first drain pipes, the other ends of the first drain pipes are matched and connected with chemical agent control mechanisms, the chemical agent control mechanisms are matched and connected with second drain pipes, and the second drain pipes extend into the purification cavity;

the filter tank comprises a filter cavity in which a multi-layer filter screen is arranged from top to bottom.

Further, in a preferred embodiment of the disclosure, the thermal desorption system comprises an extraction system, an evaporator, a water-vapor separator and a burner which are connected in turn, the extraction system extracts water vapor in an extraction well to the evaporator, water vapor is cooled by the evaporator and then output to the water-vapor separator, and then separated to form sewage and waste gas, the sewage obtained after separation is transported to the sewage treatment assembly to be purified, and the waste gas obtained after separation is transported to the burner to be purified.

Further, in a preferred embodiment of the disclosure, the thermal desorption system further comprises the condenser, a flash tank and a steam injection well, the output end of the evaporator is communicated with the input end of the condenser through a first conveyer pipe, the output end of the condenser is communicated with the input end of the evaporator through a second conveyer pipe, the first conveyer pipe is provided with a compressor, the second conveyer pipe is provided with a throttling device, the condenser is also connected with the sewage treatment assembly and the flash tank, sewage treated by the sewage treatment assembly is purified to form clean water to flow back to the condenser for heat exchange, and then the clean water enters the flash tank to be transformed into steam to enter the steam injection well.

Further, in a preferred embodiment of the disclosure, the stirring cavity is also provided with a cleaning mechanism, the cleaning mechanism comprises a second motor, the output end of the second motor is matched and connected with a telescopic push rod, the tail end of the telescopic push rod is matched and connected with a circular sweep ring, the circular sweep ring is provided with a groove, the side wall of the groove is provided with several spray nozzles along the circumference at intervals, the stirring cavity is isolated from a contaminant collection cavity through a funnel-shaped spacer plate, the caliber of the upper end of the funnel-shaped spacer plate is larger than that of the lower end of the funnel-shaped spacer plate, the side of the funnel-shaped spacer plate is conical, and the bottom of the contaminant collection cavity is provided with a drain outlet.

Further, in a preferred embodiment of the disclosure, the chemical agent control mechanism comprises a first connection plate and a second connection plate, the first connection plate is provided with a first through hole, the second connection plate is provided with a second through hole, a liquid plugging plate is arranged between the first connection plate and the second connection plate, the liquid plugging plate is provided with a third through hole, one side of the first connection plate is fixedly connected with an adjusting seat, the adjusting seat is provided with a guide plate, an electromagnetic block and a sliding block, the liquid plugging plate is fixedly connected with several connection rods, other ends of the connection rods penetrate through the guide plate and are fixedly connected with the sliding block.

Further, in a preferred embodiment of the disclosure, the connection rod is sleeved with a telescopic spring, one end of the telescopic spring is fixedly connected with the guide plate, the other end is fixedly connected with the sliding block, the bottom of the adjusting seat is provided with a sliding slot, the sliding block is embedded into the sliding slot, several infrared sensors are arranged in the sliding slot at intervals along the length direction, and the infrared sensors are used for detecting the position information of the sliding block.

Further, in a preferred embodiment of the disclosure, the chemical purification tank is provided with a temperature control mechanism, the temperature control mechanism comprises a wrapping layer, a temperature control flow channel and a condenser, the wrapping layer is wrapped on the circumferential wall of the purification tank, the temperature control flow channel surrounds in the wrapping layer from top to bottom, and the temperature control flow channel is connected with the condenser.

Further, in a preferred embodiment of the disclosure, the chemical purification tank is provided with a first sensor for detecting the temperature information of sewage in the purification cavity, a second sensor for detecting the liquid level information of sewage in the purification cavity and a third sensor for detecting the concentration and category information of organic matters in sewage in the purification cavity.

The second aspect of the disclosure provides a sewage treatment method for a thermal desorption system, which is applied to the sewage treatment device for the thermal desorption system, and comprises the following steps:

pretreating sewage through the stirring mechanism, performing friction extrusion on sewage through the stirring blade to destroy the stability of large particle suspended matters in sewage so that the large particle suspended matters are mutually adsorbed to be precipitated;

primarily treating sewage by using a chemical agent so that the molecular chains of the organic matters in sewage are broken to form inorganic molecules; and posttreating sewage through a multi-stage filter screen to filter fine suspended matters in sewage and then purify the sewage to form clean water.

Further, in a preferred embodiment of the disclosure, primary treatment is performed on the sewage through the chemical agent so that the molecular chains of the organic matters in sewage are broken to form the inorganic molecules. The sewage treatment method specifically comprises the following steps:

acquiring concentration information and category information of organic matters in sewage;

controlling a chemical agent control mechanism on a corresponding chemical agent storage bottle to be started according to the category information of the organic matters so as to add the corresponding chemical agent into the chemical purification tank; and controlling the power-on time of the electromagnetic block on the corresponding chemical agent control mechanism according to the concentration information of the organic matters so as to add a corresponding amount of chemical agent into the chemical purification tank.

According to the sewage treatment device and method for the thermal desorption system disclosed by the disclosure, the process of purifying large particle suspended matters in sewage is completed through a particle precipitation tank so as to reduce the posttreatment process of sewage, reduce the purification cost, improve the sewage purification effect, and the efficiency of removing large particle suspended matters in sewage is extremely high so as to improve purification efficiency and improve economic benefits; the cleaning mechanism can automatically clean the stirring cavity without artificially cleaning the inner wall of the stirring cavity so as to alleviate people's burden, save labor and realize automation; through the chemical reaction tank, the organic matters in sewage can be removed, and the addition amount of the chemical agent can be precisely controlled, so the device is simple in entire structure, easy to control, low in cost and wide in application range; a heat pump technology is used for extracting steam and recovering waste heat, a high-temperature heat pump is used for producing vapor from reused sewage after treatment, so as to form thermal conduction and heating of a steam coupling system with good energy conservation and emission reduction effect.

DESCRIPTION OF THE DRAWINGS

To more clearly illustrate the technical solution in embodiments of the disclosure or in the prior art, accompanying drawings required to be used in the embodiments or in the prior art will be simply discussed below, obviously, the drawings in the following descriptions are only some embodiments of the disclosure, persons of ordinary skill in the art can also obtain drawings in other embodiments according to these drawings without creative efforts.

FIG. 11 is a diagram of an interior structure of an electromagnetic block on a chemical agent control mechanism when being powered on;

Figure 1:
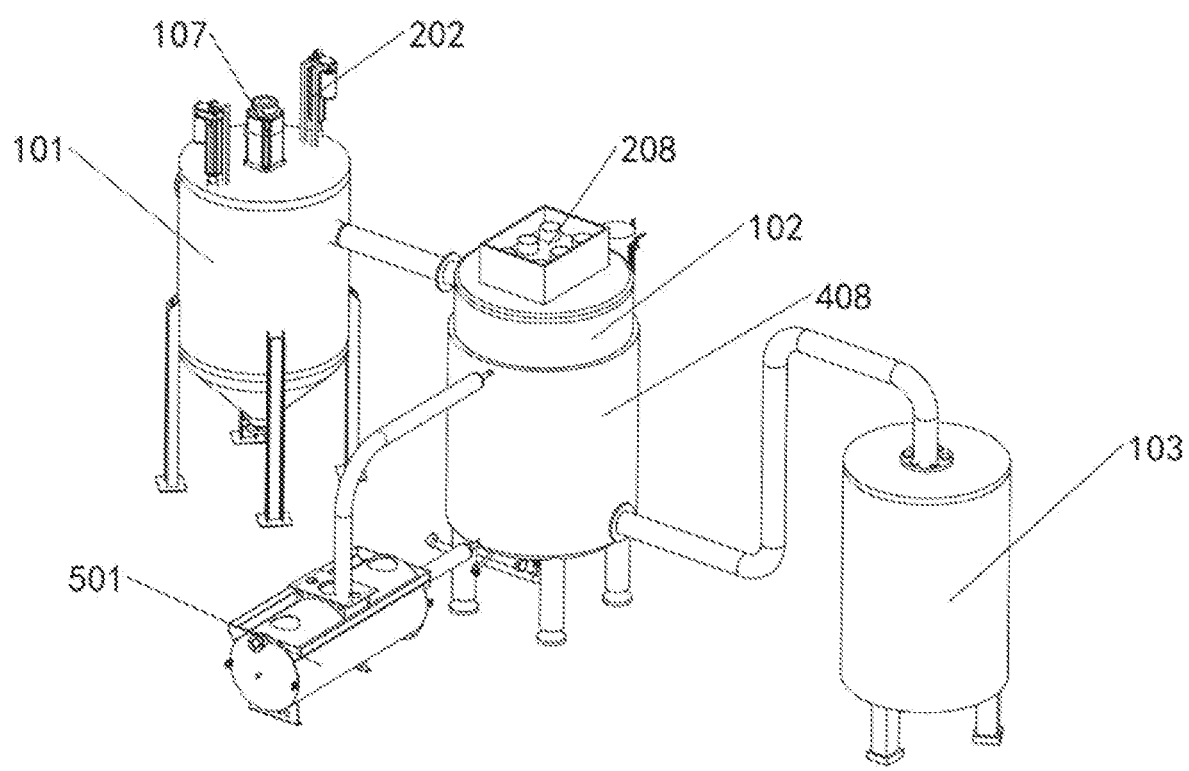
FIG. 1 is a diagram of a stereostructure of a sewage treatment device.

Reference number: 101, particle precipitation tank; 102, chemical purification tank; 103, filter tank; 104, stirring cavity; 105, contaminant collection cavity; 106, stirring shaft; 107, first motor; 108, stirring blade; 109, water barrier column; 201, limber; 202, second motor; 203, telescopic push rod; 204, circular sweeping ring; 205, groove; 206, spray nozzle; 207, purification cavity; 208, chemical agent storage box; 209, chemical agent storage bottle; 301, first drain pipe; 302, chemical agent control mechanism; 303, second drain pipe; 304, first connection plate; 305, second connection plate; 306, first through hole; 307, second through hole; 308, liquid plugging plate; 309, third through hole; 401, adjusting seat; 402, guide plate; 403, electromagnetic block; 404, sliding block; 405, connection rod; 406, telescopic spring; 407, sliding slot; 408, wrapping layer; 409, temperature control flow channel; 501, condenser; 502, filter cavity; 503, filter screen; 504, funnel-shaped spacer plate.

DETAILED DESCRIPTION OF PREFERRED EMBODIMENTS

In order to better understand the above purposes, features and advantages of the invention, the invention is further described in detail in combination with the attached drawings and specific embodiments. These drawings are simplified schematic diagrams, which only illustrate the basic structure of the disclosure in an illustrative way. Because they only show the composition related to the disclosure, it is necessary to note that, without conflict, the embodiments in the present application and the features in the embodiments can be combined with each other.

In the description of the present application, it should be understood that the orientation or position relationship indicated by the terms "center", "vertical", "horizontal", "up", "down", "front", "back", "left", "right", "vertical", "horizontal", "top", "bottom", "inside", "outside", etc. is based on the orientation or position relationship shown in the attached drawings, and is only for the convenience of describing the present application and simplifying the description rather than indicating or implying that the device or element referred to must have a specific orientation, be constructed and operated in a specific orientation, so it cannot be understood as limiting the scope of protection of the present application. In addition, the terms "first", "second" and the like are only used for descriptive purposes and cannot be understood as indicating or implying relative importance or implying the number of technical features indicated. Therefore, the features limited to "first", "second" and the like can explicitly or implicitly include one or more of these features. In the description of the disclosure, unless otherwise stated, "multiple" means two or more.

In the description of the present application, it should be noted that unless otherwise specified and limited, the terms "installation", "connection" and "linkage" should be understood in a broad sense, for example, they can be fixed connection, removable connection, or integrated connection; it can be mechanical connection or electrical connection; it can be directly connected or indirectly connected through intermediate media, which can be the internal connection of two components. For those skilled in the art, the specific meaning of the above terms in the present application can be understood through specific circumstances.

In order to facilitate the understanding of the disclosure, the disclosure will be described more comprehensively with reference to the relevant drawings. A preferred embodiment of the present invention is shown in the attached drawings. However, the disclosure can be realized in many different forms but not limited to embodiments described herein. On the contrary, these embodiments are provided for a more thorough and comprehensive understanding of the contents disclosed in the disclosure.

The first aspect of the disclosure provides a sewage treatment device for a thermal desorption system, including the thermal desorption system and a sewage treatment assembly connected with the thermal desorption system.

As shown in FIG. 1, the sewage treatment assembly includes a particle precipitation tank 101 for removing large particle suspended matters in sewage, a chemical purification tank 102 for removing organic matters in sewage and a filter tank 103 for removing fine suspended matters in sewage, which are connected in turn.

Figure 2:
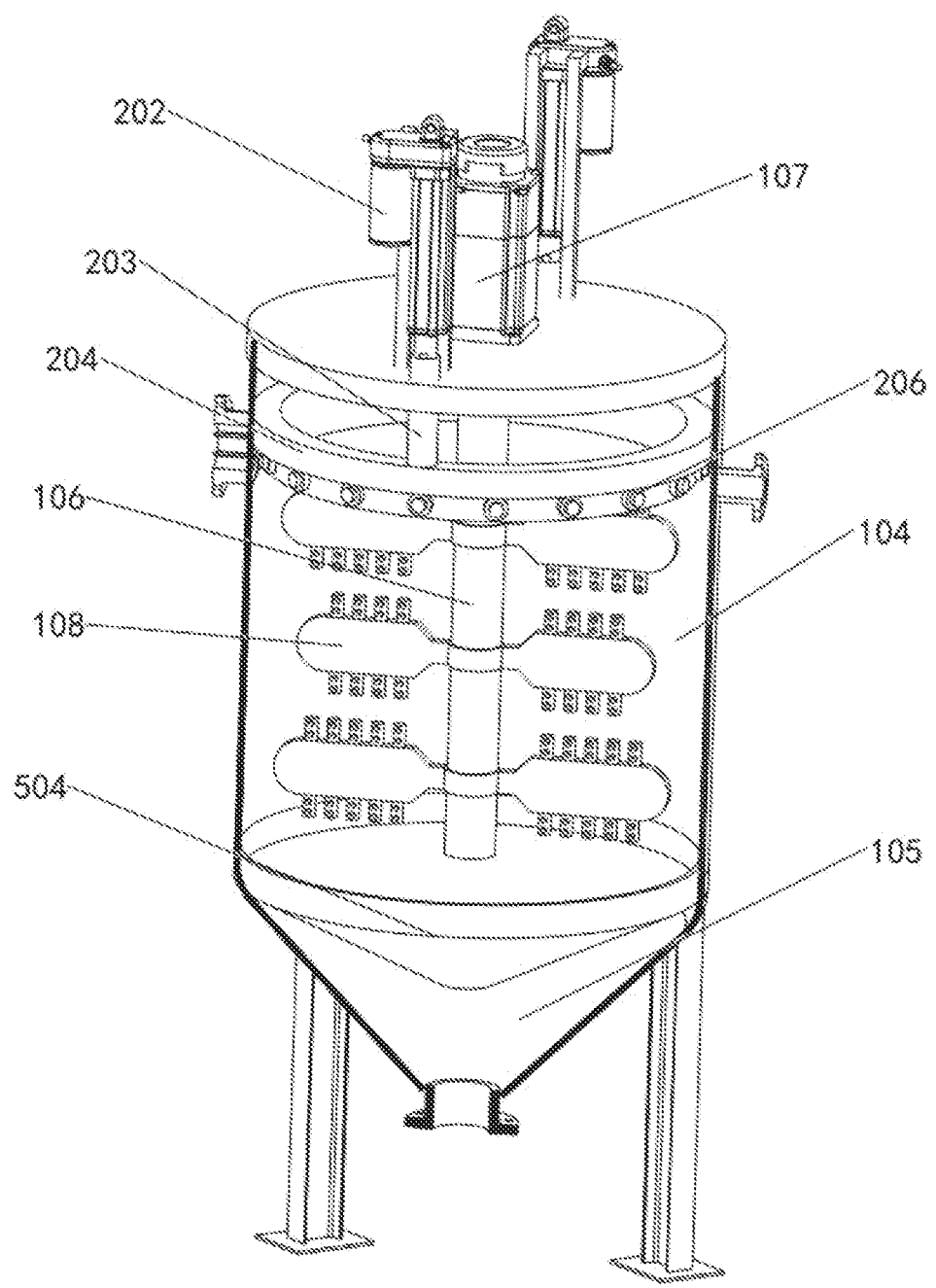
FIG. 2 is a diagram of an interior structure of a particle precipitation tank.
Figure 3:
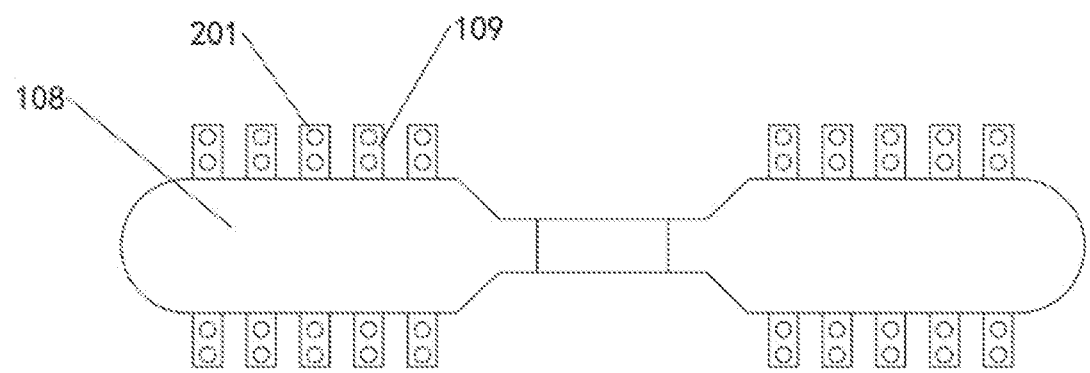
FIG. 3 is a structural diagram of a stirring blade.
Figure 4:
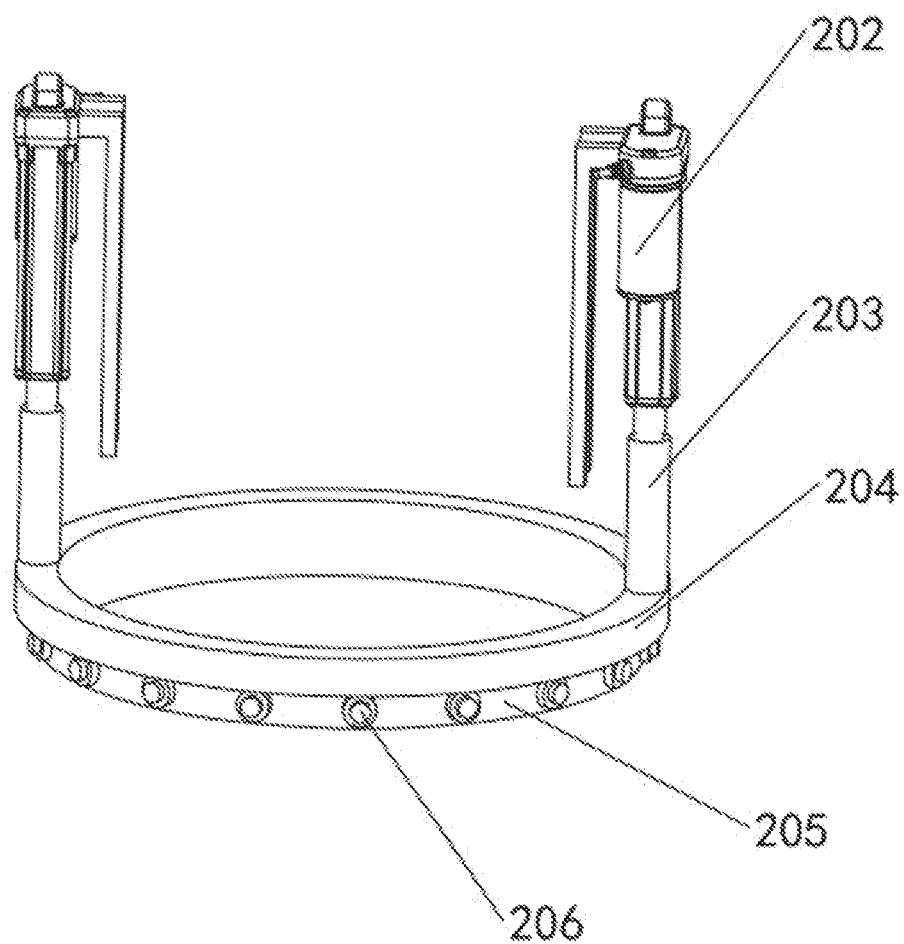
FIG. 4 is a structural diagram of a cleaning mechanism.

As shown in FIGS. 2, 3 and 4, the particle precipitation tank 101 includes a stirring cavity 104 and a contaminant collection cavity 105. The stirring cavity 104 is provided with a stirring mechanism, the stirring mechanism includes a stirring shaft 106 provided with several groups of stirring blades 108 along the length direction and a first motor 107 driving the stirring shaft 106 to rotate, and the several groups of stirring blades 108 is unequal in length, several water barrier columns 109 are arranged on the upper and lower sides of the several groups of stirring blades 108 are provided with several water barrier columns 109, and the water barrier columns 109 are provided with several limbers 201.

It should be noted that the large particle suspended matters in sewage are removed through the particle precipitation tank 101. After the sewage is discharged into the stirring cavity 104, the first motor 107 is driven to make the first motor 107 drive the stirring shaft 106 to rotate, and then allow the mixing blade 108 to rotate along with the stirring shaft 106. At least three groups of stirring blades 108 are arranged, and the length of each group of stirring blades 108 along the radial direction are unequal, setting different lengths for each group of stirring blades 108 is intended to improve the stirring effect of the stirring blades 108, allow the stirring blades 108 to collide and rub with the sewage at different levels in the stirring cavity 104, so that the sewage forms different levels of radial vortex layers to cause the sewage at the junction of adjacent vortex layers to squeeze m each other to damage the stability of the large particle suspended matters in sewage to form small particulate colloidal suspended matters from the large particle suspended matters; meanwhile, the upper and lower sides of the mixing blade 108 are provided with a plurality of water barrier columns 109, the water barrier columns 109 are provided with limbers 201, the sewage forms different levels of radial vortex layers in the stirring cavity 104. During the rotation of the mixing blade 108, the water barrier columns 109 collide and rub with the sewage in the radial vortex layer in the axial direction so that the sewage is separated at both sides of the water barrier columns 109, and then the sewage forms an axial vortex layer, the axial vortex layers between the adjacent water barrier columns 109 squeeze each other to further damage the stability of the large particles in sewage to form small colloidal suspended matters from making the large particle suspended matters; the function of the limber 201 is that during the rotation of the water barrier column 109, a part of the sewage can flow along the limber 201. During the process of the sewage flowing through the limber 201, the flow rate of the sewage will increase instantaneously, which causes the water molecules to be rearranged, reduces a distance between water molecules while reducing a distance between the small particulate colloidal suspended matters, so that the small particulate colloidal suspended matters can bond with each other, and then form colloidal particles with large mass, With the continuous rotation of the stirring blades 108, the colloidal particles adhere to each other to cause their mass to continuously increase. When the gravity is greater than the buoyancy, they will settle into the contaminant collection cavity 105, thus completing the purification process of large particle suspended matters in sewage, reducing the post-treatment process of sewage, reducing the purification cost and improving the purification effect of the sewage. Furthermore, compared with the traditional stirring device, this stirring mechanism has extremely high efficiency in removing large particles in sewage, improves purification efficiency, saves resources to a great extent, and improves economic benefits.

The stirring cavity 104 is also provided with a cleaning mechanism. The cleaning mechanism includes a second motor 202. The output end of the second motor 202 is matched and connected with a telescopic push rod 203. The end of the telescopic push rod 203 is matched and connected with a circular sweeping ring 204. The circular sweeping ring 204 is provided with a groove 205. The side wall of the groove 205 is provided with several spray nozzles 206 in the circumferential direction at intervals, the stirring cavity 104 and the contaminant collection cavity 105 are separated by a funnel-shaped spacer plate 504. The caliber of the upper end of the funnel-shaped spacer plate is larger than that of the lower end. The side of the funnel-shaped spacer plate is conical, and the bottom of the contaminant collection cavity 105 is provided with a drain outlet.

It should be noted that the stirring cavity 104 is isolated from a contaminant collection cavity 105 through a funnel-shaped spacer plate, the caliber of the upper end of the funnel-shaped spacer plate is larger than that of the lower end of the funnel-shaped spacer plate, and the side of the funnel-shaped spacer plate is conical. After the large suspended particles in sewage are transformed into colloidal particles with large weight, the colloidal particles are precipitated on the funnel-shaped spacer plate and then fall into the contaminant collection cavity 105. One function of the funnel-shaped spacer plate is to make the colloidal particles can well fall into the contaminant collection cavity 105 along the conical surface; another function is to prevent the colloidal particles falling into the contaminant collection cavity 105 from flowing back into the stirring cavity 104. When it is necessary to drain, the drain outlet is just opened to remove the colloidal particles.

It should be noted that when the sewage is stirred by using the stirring mechanism, the sewage forms a vortex. In the process that the vortex contacts and rubs with the inner wall of the stirring cavity 104, the colloidal particles can be adsorbed onto the inner wall of the stirring cavity 104. If the colloidal particles are adsorbed and adhered onto the inner wall for a long time, the purification effect of the sewage is greatly reduced. The traditional solution is to manually and regularly clean the stirring cavity 104, which is time-consuming and laborious, and needs to consume a lot of labors. This device can automatically clean the inner wall of the stirring cavity 104 through the cleaning mechanism. The specific implementation process is that when it is needed to clean the stirring cavity 104, the second motor 202 is driven so that the second motor 202 pushes the telescopic push rod 203 to move up and down, and then drives the circular sweeping ring 204 to move up and down so that the circular sweeping ring 204 scrapes the colloidal particles adsorbed onto the inner wall of the stirring cavity 104 into the contaminant collection cavity 105. In addition, the circular sweeping ring 204 is provided with a groove 205, and the side wall of the groove 205 is provided with several spray nozzles 206 at intervals in the circumferential direction. During the cleaning, the spray nozzles 206 can spray clean water or a detergent to the inner wall of the stirring cavity 104 to further improve the cleaning effect. In such the way, the stirring cavity 104 can be cleaned automatically by the cleaning mechanism without manual work, thereby reducing people's burden, saving labor and realizing automation.

Figure 5:
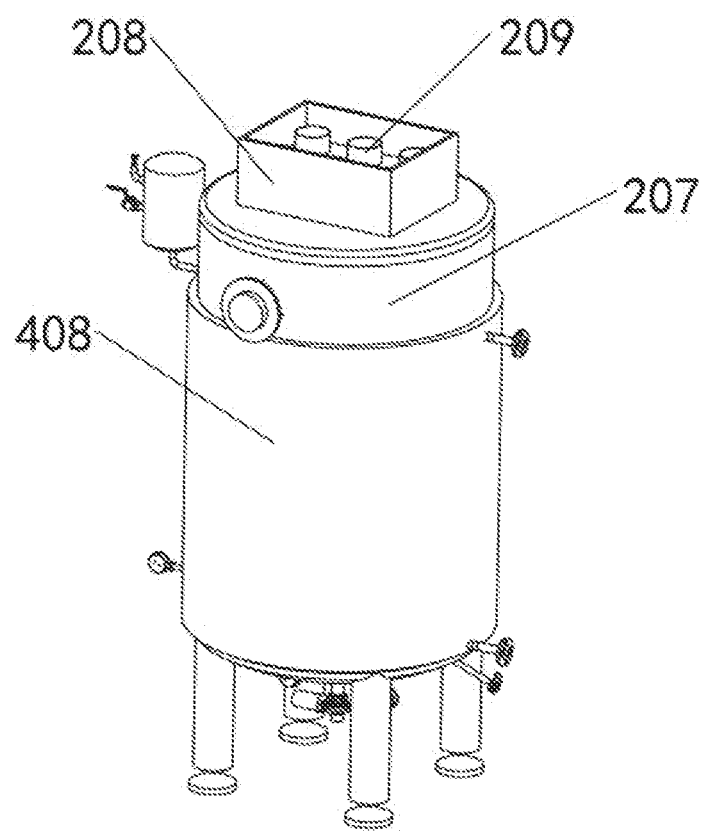
FIG. 5 is a structural diagram of a chemical purification tank.
Figure 6:
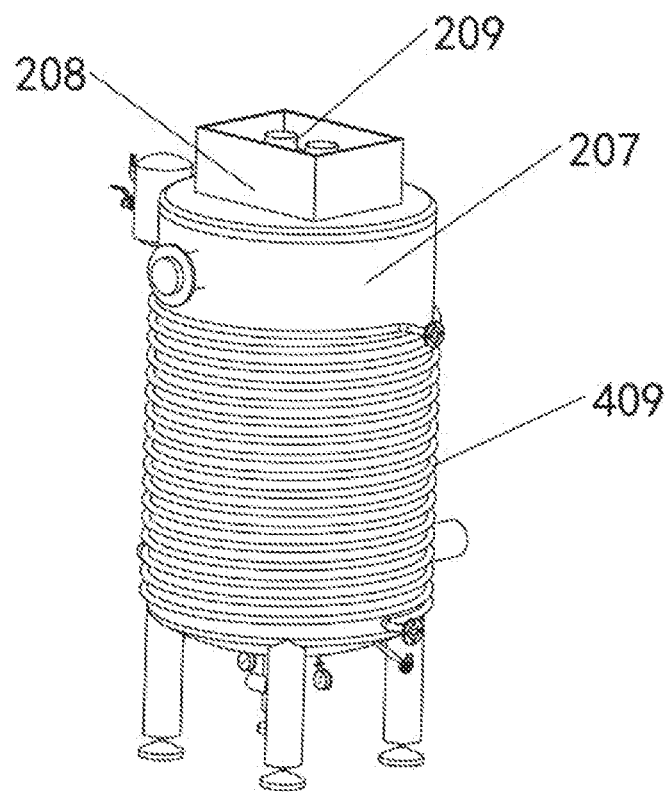
FIG. 6 is a structural diagram of a temperature control mechanism.
Figure 7:
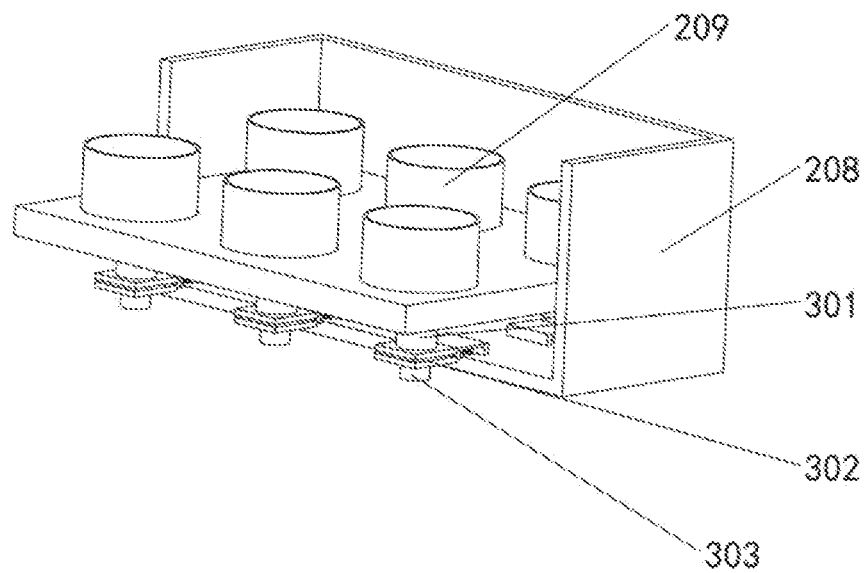
FIG. 7 is a diagram of an interior structure of a chemical agent storage box.
Figure 8:
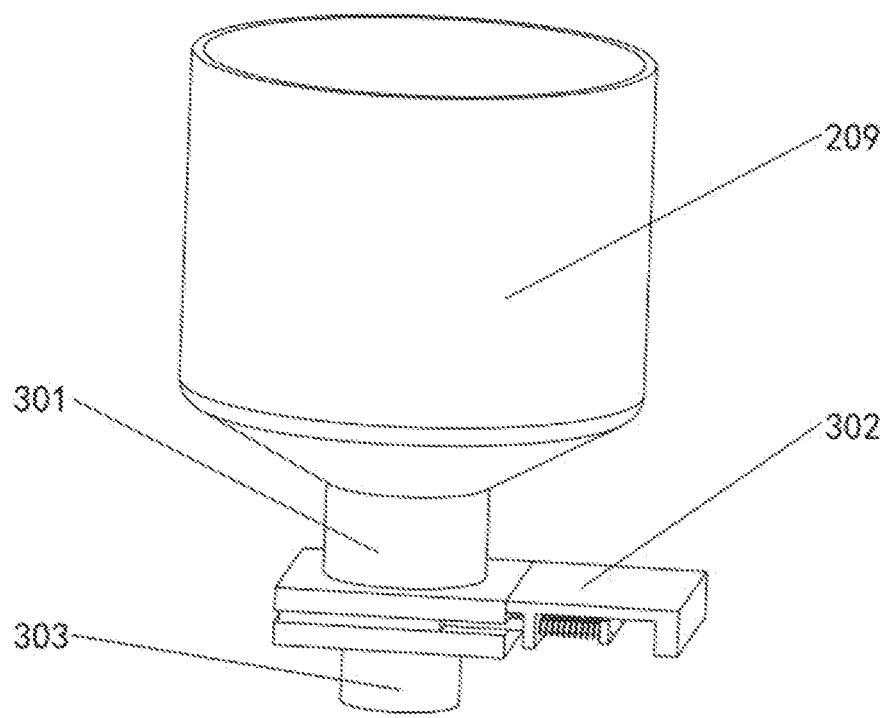
FIG. 8 is a structural diagram of a chemical agent storage bottle.
Figure 9:
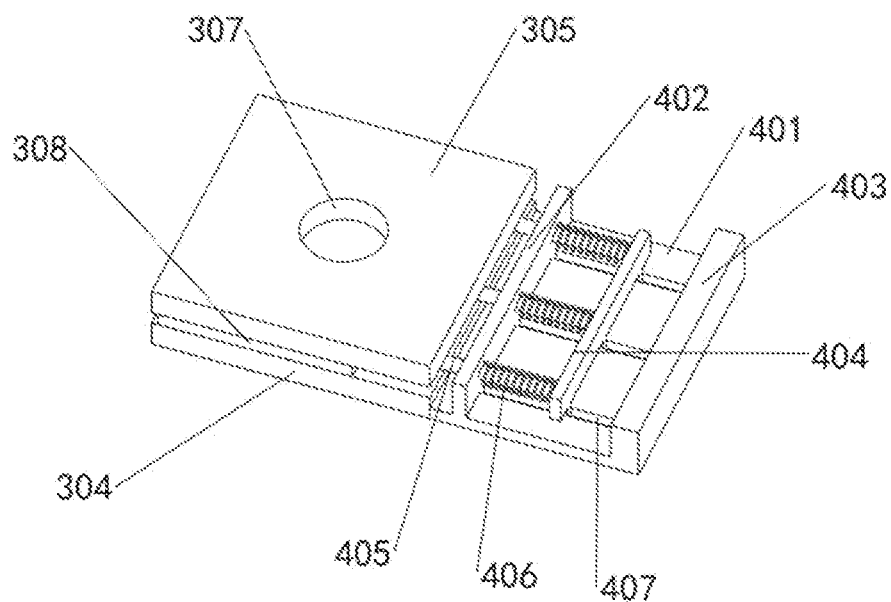
FIG. 9 is a structural diagram of a chemical agent control mechanism.
Figure 10:
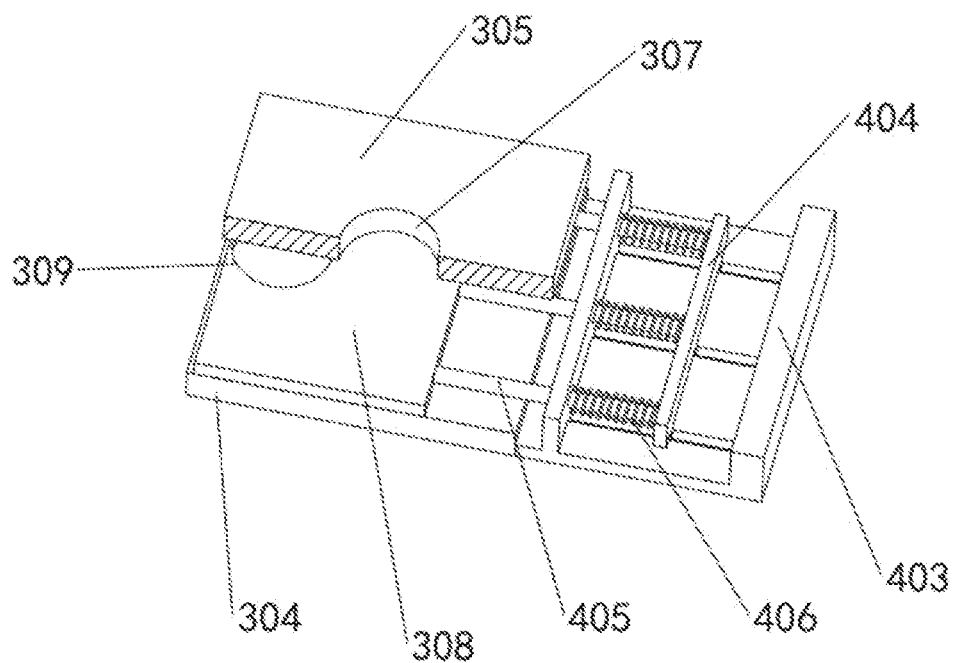
FIG. 10 is a diagram of an interior structure of an electromagnetic block on a chemical agent control mechanism when being powered off.
Figure 11:
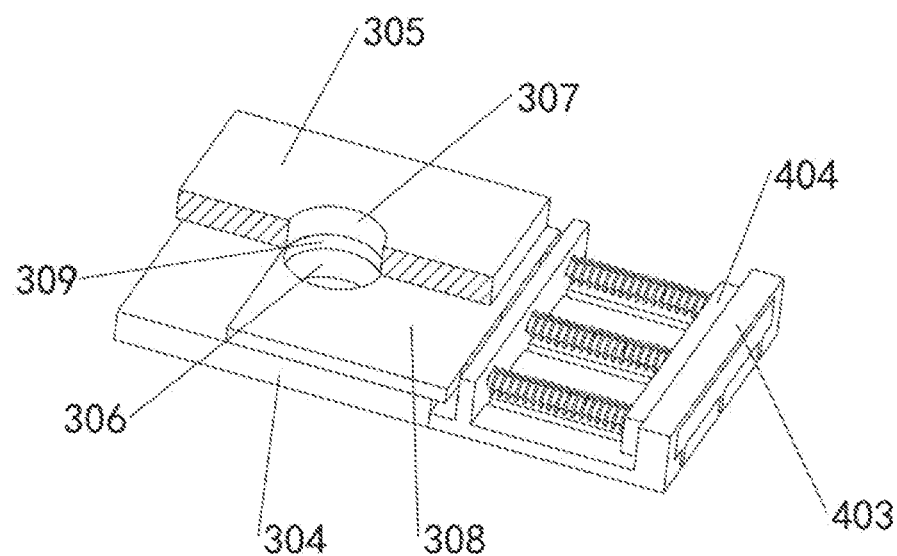
Figure 12:
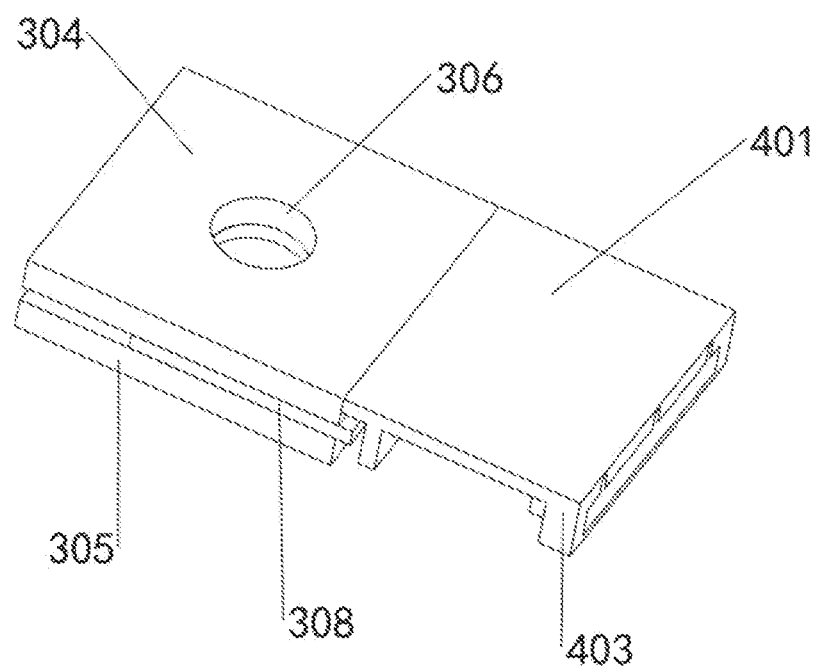
FIG. 12 is a structural diagram of a chemical agent control mechanism at another angle of view.

As shown in FIGS. 5, 6 and 7, the chemical purification tank 102 includes a purification cavity 207. The top of the chemical purification tank 102 is provided with a chemical agent storage box 208. The chemical agent storage box 208 is provided with several chemical storage bottles 209. The chemical storage bottles 209 are matched and connected with first drain pipes 301. The other ends of the first drain pipes 301 are connected with a chemical control mechanism 302, and the chemical agent control mechanism 302 is matched and connected with a second drain pipe 303, and the second drain pipe extends into the purification cavity 207.

It should be noted that after the large particle suspended matters in the sewage are removed through the particle precipitation tank 101, the sewage is pumped into the chemical purification tank 102 so as to remove organic matters in the sewage through the chemical purification tank 102. The chemical agent storage box 208 is installed on the top of the chemical purification tank 102, and is provided with a plurality of chemical agent storage bottles 209. Each chemical agent storage bottle 209 contains different chemical agents. When the chemical agent control mechanism 302 is controlled to be opened, the chemical agent flows into the purification cavity 207 along the first drain pipe 301 and the second drain pipe 303 under the action of gravity, and then reacts with the organic matters in the sewage so that the organic matters in the sewage are transformed into inorganic matters.

As shown in FIGS. 8, 9, 10, 11 and 12, the chemical control mechanism 302 includes a first connection plate 304 and a second connection plate 305. The first connection plate 304 is provided with a first through hole 306, the second connection plate 305 is provided with a second through hole 307, a liquid plugging plate 308 is arranged between the first connection plate 304 and the second connection plate 305, and the liquid plugging plate 308 is provided with a third through hole 309, and one side of the first connection plate 304 is fixedly connected with an adjusting seat 401. The adjusting seat 401 is provided with a guide plate 402, an electromagnetic block 403 and a sliding block 404. The liquid plugging plate 308 is fixedly connected with several connection rods 405. The other ends of the connection rods 405 penetrate through the guide plate 402 and are fixedly connected with the sliding block 404.

The connection rod 405 is also sleeved with a telescopic spring 406. One end of the telescopic spring 406 is fixedly connected with the guide plate 402, and the other end of the telescopic spring 406 is fixedly connected with the sliding block 404. The bottom of the adjusting seat 401 is provided with a sliding slot 407. The sliding block 404 is embedded into the sliding slot 407. The sliding slot 407 is provided with several infrared sensors along the length direction at intervals. The infrared sensors are used for detecting the position information of the sliding block 404.

It should be noted that the first through hole 306 and the second through hole 307 are equal in diameter and coaxially arranged, and the chemical agent can be intelligently added into the purification cavity 207 through the chemical agent control mechanism 302. The specific implementation mode is that when the chemical agent needs to be added into the purification cavity 207, the electromagnetic block 403 is powered on, and the electromagnetic block 403 has magnetic force after being powered on. Under the effect of magnetic force, the sliding block 404 is adsorbed onto the electromagnetic block 403. Meanwhile, in the sliding process of the sliding block 404, the connection rod 405 slides as well, and then the liquid plugging plate 308 is pulled. When the sliding block 404 is adsorbed to the electromagnetic block 403, the third through hole 309 on the liquid plugging plate 308 is just aligned with the first through hole 306 and the second through hole 307 so that the liquid plugging plate 308 can no longer block the chemical agent, and then the chemical agent on the chemical agent storage bottle 209 can flow into the purification cavity 207 along the first drain pipe 301 and the second drain pipe 303, and then the adding process of the chemical agent is automatically completed; when no chemical agent is needed to enter the purification cavity 207, the electromagnetic block 403 is powered off and loses the magnetic force. The stretched telescopic spring 406 resets under the action of the rebound force, and then the sliding block 404 is driven to reset, so that the liquid plugging plate 308 resets, which causes the first through hole 306, the second through hole 307 and the third through hole 309 not to be communicated. The liquid plugging plate 308 blocks the chemical agent, so that the chemical agent cannot enter the purification cavity 207. In addition, because the first through hole 306, the second through hole 307 and the third through hole 309 are equal in diameter, the flow rate of the chemical agent is fixed, and the input amount of the chemical agent can be calculated only by calculating the power-on time of the electromagnetic block 403. In this way, the specific chemical agent can be added into the purification cavity 207 only by controlling the chemical agent control mechanism 302 on the corresponding chemical agent storage bottle 209, and the amount of chemical agent can be controlled only by controlling the power-on time of the electromagnetic block 403. The device is simple in entire structure, easy to control, low cost, and wide in application range.

It should be noted that in the process that the electromagnetic block 403 adsorbs the sliding block 404 or the telescopic spring 406 drives the sliding block 404 to reset, the guide plate 402 and the sliding slot 407 play a guiding and supporting role, which can avoid the position deviation of the sliding block 404 during the sliding, and then further improves the stability and reliability of the device.

It should be noted that the sliding slot 407 is provided with a plurality of infrared sensors at intervals to conduct fault analysis on the device. When the electromagnetic block 403 is powered on, the position information of the sliding block 404 is detected by the infrared sensor. If the sliding block 404 is not adsorbed onto the electromagnetic block 403, it means that the electromagnetic block 403 has lost its magnetic force due to fault; when the electromagnetic block 403 is powered off, the infrared sensor detects the position information of the sliding block 404. If the sliding block 404 does not move back to the original position, it means that the telescopic spring 406 and the restoring elastic force have been lost due to the fault; When the device has the above faults, the infrared sensor can feed back the information to the control system, and the control system sends the fault report to the remote user, so that the user can accurately and quickly understand the cause of the fault and carry out maintenance and replacement. When the fault occurs, there is no need for manual troubleshooting, which saves the troubleshooting time, improves the labor efficiency, and when the device has a fault, users can know the fault and repair it, thus improving the reliability of the device.

The chemical purification tank 102 is provided with a first sensor for detecting the temperature information of the sewage in the purification cavity 207, a second sensor for detecting the level information of the sewage in the purification cavity 207 and a third sensor for detecting the concentration and category information of organic matters of the sewage in the purification cavity 207.

It should be noted that before the chemical agent is added to the purification cavity 207, the liquid level information of the sewage in the purification cavity 207 is detected by the second sensor, and the volume of the sewage to be purified at present is further calculated; furthermore, the category and concentration information of organic matters are detected by the third sensor; the modes and addition amount of the chemical agents required to be added are calculated by the data processor on the control system according to the volume of the current sewage, the category of the organic matters and the concentration information of the organic matters, then the control system controls the electromagnetic block 403 on the corresponding chemical storage bottle 209 to be powered on so that the corresponding chemical agent is added into the purification cavity 207, and then controls the addition amount of the chemical agent through the power-on time of the electromagnetic block 403, and then the chemical agent reacts with the organic matters in sewage to remove the organic matters in the sewage. In such the way, the control system can accurately and quantitatively add the chemical agent into the purification cavity 207 according to the volume of the sewage, the category of the organic matters and the concentration information of the organic matters, which can avoid the waste caused by excessive addition of the agent or the incomplete purification caused by insufficient addition of the chemical agent, thereby ensuring the purification effect while saving energy, and realizing the automatic control process, without addition of the chemical agent by virtue of human experience.

As shown in FIG. 5 and FIG. 6, the chemical purification tank 102 is provided with a temperature control mechanism, the temperature control mechanism includes a wrapping layer 408, a temperature control flow channel 409 and a condenser 501. The wrapping layer 408 is wrapped on the circumferential wall of the purification tank, the temperature control flow channel 409 surrounds in the wrapping layer 408 from top to bottom, and the temperature control flow channel 409 is connected with the condenser 501.

It should be noted that the temperature control mechanism is used for adjusting the reaction temperature of the chemical agent and the sewage. The temperature significantly affects the reaction efficiency and reaction rate of the chemical agent and the organic matter. When the third sensor identifies the category information of the organic matter, the control system can calculate the optimal reaction temperature range according to the category of the organic matter. Then the temperature information of the sewage in the purification cavity 207 is obtained through the first sensor. If the temperature range of the sewage in the purification cavity 207 is not within the optimal reaction temperature range, the control system controls the temperature control mechanism to adjust the sewage temperature so that the sewage temperature is within the optimal reaction temperature range. The control process of the temperature control mechanism is as follows: the condenser 501 is provided with a first liquid cavity and a second liquid cavity, and the first liquid cavity is provided with circulating water, The water inlet of the temperature control flow channel 409 is connected with the water outlet of the first liquid cavity, and the water outlet of temperature control flow channel 409 is connected with the water inlet of the first liquid cavity. When it is necessary to adjust the reaction temperature of the sewage in the purification tank, a temperature-regulating agent is introduced into the second liquid cavity, so that the temperature-regulating agent of the second liquid cavity and the circulating water of the first liquid cavity complete cold and heat exchange, so as to adjust the circulating water to an appropriate temperature, and then the circulating water is pumped into the temperature control flow channel 409 so that the circulating water flows in the temperature control flow channel 409, so that the circulating water transfers heat to the sewage in the purification cavity 207 to adjust the temperature of the sewage. Then the circulating water flows back to the first liquid cavity, so as to complete the process of circulating temperature regulation. In addition, the temperature control flow channel 409 is arranged in the wrapping layer 408, and the circulating water does not contact with the sewage in the purification cavity 207 during the regulation of the temperature, and does not affect the purification process of the sewage, and the adjustment process is simple, easy to control and low in cost. In such the way, the control system can adjust the sewage to the appropriate reaction temperature range according to the category of the organic matters in sewage, thus improving the reaction efficiency and effect of the organic matters and the chemical agent in the sewage.

Figure 13:
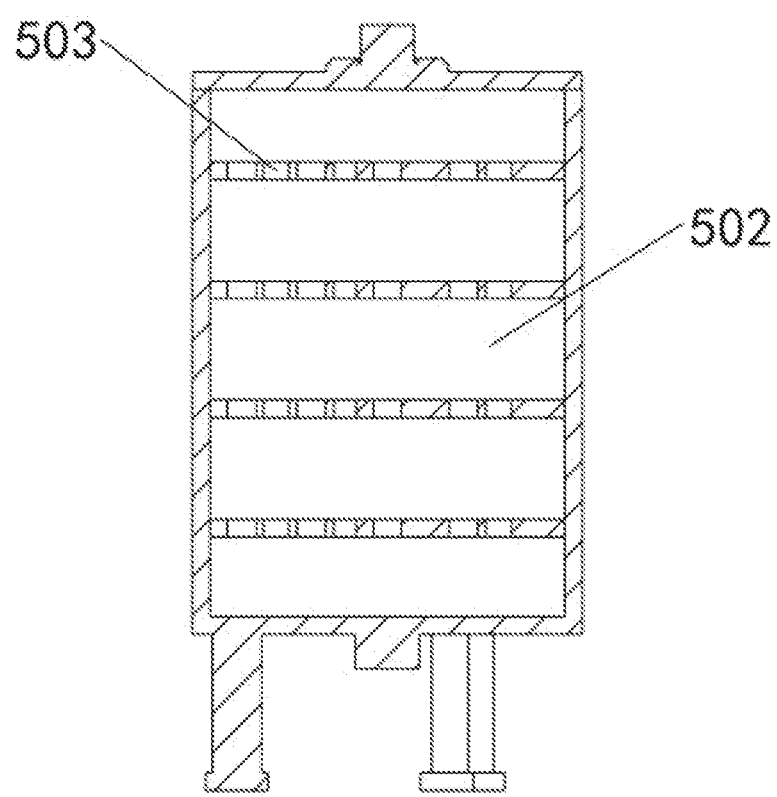
FIG. 13 is a cross-sectional view of a filter tank.

As shown in FIG. 13, the filter tank 103 includes a filter cavity 502, and the filter cavity 502 is provided with a multi-layer filter screen 503 from top to bottom.

It should be noted that after the organic matter in the sewage is removed through the chemical purification tank 102, the sewage is pumped into the filter tank 103, and the filter tank 103 is provided with a multi-stage filter screen 503. The fine suspended matters in sewage are filtered out through the filter screen 503, so that the sewage can be purified to the qualified clean water, and the clean water can be discharged or reused to the flash tank.

Figure 14:
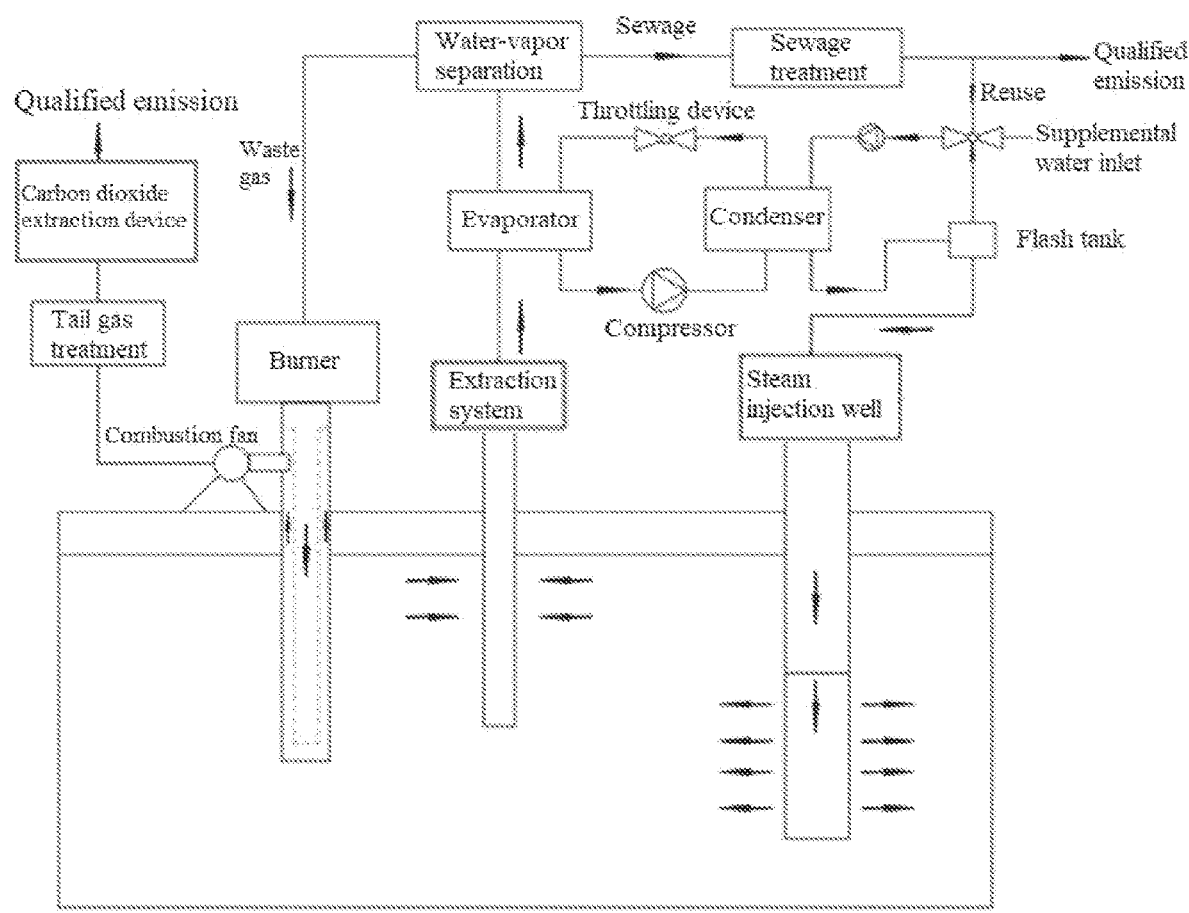
FIG. 14 is a process flow diagram of a thermal desorption system.

As shown in FIG. 14, the thermal desorption system comprises an extraction system, an evaporator, a water-vapor separator and a burner that are connected in sequence. The extraction system extracts water vapor from the extraction well into the evaporator. The water vapor is cooled by the evaporator and then transported to the water-vapor separator to be separated to form sewage and waste gas. The sewage after separation is conveyed to the sewage treatment assembly for purification treatment, and the waste gas after separation is conveyed to the burner for purification treatment.

The thermal desorption system also includes a condenser 501, a flash tank and a steam injection well. The output end of the evaporator is connected with the input end of the condenser 501 through a first conveyer pipe. The output end of the condenser 501 is connected with the input end of the evaporator through a second conveyer pipe. The first conveyer pipe is provided with a compressor, and the second conveyer pipe is provided with a throttling device, the condenser 501 is also connected with the sewage treatment assembly and the flash tank. The sewage treated by the sewage treatment assembly is purified to form clean water to flow back to the condenser 501 for heat exchange, and then enters the flash tank to be transformed into steam to enter the steam injection well.

It should be noted that the condenser 501 is also provided with a third liquid cavity. The water inlet of the third liquid cavity is connected with a pipeline of supplemental water subjected to purification treatment, and the water outlet is connected with the flash tank. The thermal desorption system also includes a heat pump, the water vapor extracted by the heat pump is cooled by the evaporator, and then separated by the water-vapor separator to form sewage and waste gas. The waste gas is introduced into the burner for reburning, and the waste gas after burning enters a carbon dioxide capture device after being treated to complete emission reduction; the sewage is purified in the sewage treatment assembly to be transformed into clean water, and then the clean water is discharged or reused. The evaporator is provided with a temperature regulating agent. When the water vapor passes through the evaporator, the temperature regulating agent absorbs the residual heat of the water vapor to be vaporized to form a low-temperature low-pressure gas, the low-temperature low-pressure gas is then compressed into a high-temperature high-pressure gas through the compressor, and then the high-temperature high-pressure gas enters the second liquid cavity of the condenser 501 to transfer heat the supplemental water in the third liquid cavity to be transformed into a low-temperature high-pressure gas. The low-temperature high-pressure gas is transformed into a low-temperature low-pressure liquid through the throttling device and then flows back to the evaporator. After being heated, the supplemental water enters the flash tank to be transformed into steam to enter the steam injection well. In such the way, the heat pump technology is used for extracting the waste heat of steam for recovery and for steam generation through the high-temperature heat pump to form a heat conduction and steam coupling system for heating, so as to realize the collaborative treatment of contaminated soil; after the tail gas obtained by burning is treated, carbon dioxide is captured for carbon emission reduction. The water obtained after sewage treatment is reused or discharged. The reused water is used for generating steam, thereby realizing the recycling of water resources.

The second aspect of the disclosure provides a sewage treatment method for a thermal desorption system, which is applied to a sewage treatment device for the thermal desorption system described in any item, including the following steps:

S102: pretreating sewage through the stirring mechanism, performing friction extrusion on sewage through the stirring blade to destroy the stability of large particle suspended matters in sewage so that the large particle suspended matters are mutually adsorbed to be precipitated;

S104: primarily treating sewage using the chemical agent so that the molecular chains of the organic matters in sewage are broken to form inorganic molecules; and S106: posttreating sewage through a multi-stage filter screen to filter fine suspended matters in sewage and then purify the sewage to form clean water;

wherein, the primarily treating sewage using the chemical agent so that the molecular chains of the organic matters in sewage are broken to form inorganic molecules specifically comprises the following steps:

S202: acquiring concentration information and category information of organic matters in sewage;

S204: controlling a chemical agent control mechanism 302 on a corresponding chemical agent storage bottle to be started according to the category information of the organic matters so as to add the corresponding chemical agent into the chemical purification tank; and S206: controlling the power-on time of the electromagnetic block on the corresponding chemical agent control mechanism according to the concentration information of the organic matters so as to add a corresponding amount of chemical agent into the chemical purification tank.

It should be noted that before the chemical agent is added into the purification cavity 207, the liquid level information of the sewage in the purification cavity 207 is detected by the second sensor to further calculate the volume of the current sewage to be purified; furthermore, the category and concentration information of the organic matters is detected by the third sensor; the data processor on the control system calculates the model and addition amount of the chemical agent to be added according to the volume of the current sewage, the category of the organic matters and the concentration information of the organic matters, then the control system controls the electromagnetic block 403 on the corresponding chemical storage bottle 209 to power on so that the corresponding chemical agent is added into the purification cavity 207, and then the addition amount of the chemical agent is controlled through the power-on time of the electromagnetic block 403, and then the chemical agent reacts with the organic matters in sewage to remove the organic matters in sewage. In such the way, the control system can accurately and quantitatively add the chemical agent into the purification cavity 207 according to the volume of the sewage, the category of the organic matters and the concentration information of the organic matters, which can avoid the waste caused by excessive addition of the agent or the incomplete purification caused by insufficient addition of the chemical agent, thereby ensuring the purification effect while saving energy, and realizing the automatic control process, without addition of the chemical agent by virtue of human experience.

The above description is inspired by the ideal embodiment of the disclosure, and its description is more specific and detailed, but it cannot be understood as limiting the scope of the invention patent. It should be pointed out that several changes and improvements can also be made by ordinary technicians in the art without departing from the concept of the disclosure, and these changes and improvements are all included within the protective scope of the disclosure. Therefore, the protective scope of the invention patent shall be subjected to the attached claims.

We claim:

1. A control method of a sewage treatment device for a thermal desorption system, wherein sewage treatment device for the thermal desorption system comprises the thermal desorption system and a sewage treatment assembly connected with the thermal desorption system;

the sewage treatment assembly comprises a particle precipitation tank for removing first particles of suspended matters in sewage, a chemical purification tank for removing organic matters of the suspended matters in the sewage and a filter tank for removing second particles of the suspended matters in the sewage, which are connected in turn; and wherein the first particles have a larger particle size than the second particles;

the particle precipitation tank comprises a stirring cavity and a contaminant collection cavity, the stirring cavity is provided with a stirring mechanism, and the stirring mechanism comprises a stirring shaft and a first motor for driving the stirring shaft to rotate, the stirring shaft is provided with a plurality of groups of stirring blades along a length direction of the stirring shaft, the plurality of groups of stirring blades are unequal in length with each other, upper and lower sides of the plurality of groups of stirring blades are provided with a plurality of water barrier columns, and the water barrier columns are provided with a plurality of holes;

the chemical purification tank comprises a purification cavity, a top of the chemical purification tank is provided with a chemical agent storage box in which a plurality of chemical agent storage bottles are arranged, the chemical agent storage bottles are matched and connected with ends of first drain pipes, other ends of the first drain pipes are matched and connected with chemical agent control mechanisms, the chemical agent control mechanisms are matched and connected with second drain pipes, and the second drain pipes extend into the purification cavity;

the filter tank comprises a filter cavity in which a multi-layer filter screen is arranged from top to bottom;

the stirring cavity is also provided with a cleaning mechanism, the cleaning mechanism comprises a second motor, an output end of the second motor is matched and connected with a telescopic push rod, a tail end of the telescopic push rod is matched and connected with a circular sweep ring, the circular sweep ring is provided with a groove, a side wall of the groove is circumferentially provided with a plurality of spray nozzles at intervals, the stirring cavity is isolated from the contaminant collection cavity through a funnel-shaped spacer plate, a caliber of an upper end of the funnel-shaped spacer plate is larger than that of a lower end of the funnel-shaped spacer plate, a side of the funnel-shaped spacer plate is conical, and a bottom of the contaminant collection cavity is provided with a drain outlet;

each of the chemical agent control mechanisms comprises a first connection plate and a second connection plate, the first connection plate is provided with a first through hole, the second connection plate is provided with a second through hole, a liquid plugging plate is arranged between the first connection plate and the second connection plate, the liquid plugging plate is provided with a third through hole, one side of the first connection plate is fixedly connected with an adjusting seat, the adjusting seat is provided with a guide plate, an electromagnetic block and a sliding block, the liquid plugging plate is fixedly connected with ends of a plurality of connection rods, and other ends of the connection rods penetrate through the guide plate and are fixedly connected with the sliding block;

the chemical purification tank is provided with a first sensor for detecting temperature information of the sewage in the purification cavity, a second sensor for detecting liquid level information of the sewage in the purification cavity and a third sensor for detecting concentration information and type information of the organic matters in the sewage in the purification cavity;

the thermal desorption system comprises an extraction system, an evaporator, a water-vapor separator and a burner which are connected in turn, the extraction system extracts water vapor in an extraction well to the evaporator, water vapor is cooled by the evaporator and then output to the water-vapor separator, and then separated to form the sewage and waste gas, the sewage obtained after separation is transported to the sewage treatment assembly to be purified, and the waste gas obtained after separation is transported to the burner to be purified;

each of the connection rods is sleeved with a telescopic spring, one end of the telescopic spring is fixedly connected with the guide plate, another end of the telescopic spring is fixedly connected with the sliding block, a bottom of the adjusting seat is provided with a sliding slot, the sliding block is embedded into the sliding slot, and a plurality of infrared sensors for detecting position information of the sliding block are arranged in the sliding slot at intervals along a length direction of the sliding slot;

the chemical purification tank is provided with a temperature control mechanism, the temperature control mechanism comprises a wrapping layer, a temperature control flow channel and a condenser, the wrapping layer is wrapped on a circumferential wall of the chemical purification tank, the temperature control flow channel surrounds in the wrapping layer from top to bottom, and the temperature control flow channel is connected with the condenser;

the thermal desorption system further comprises the condenser, a flash tank and a steam injection well, an output end of the evaporator is communicated with an input end of the condenser through a first conveyer pipe, an output end of the condenser is communicated with an input end of the evaporator through a second conveyer pipe, the first conveyer pipe is provided with a compressor, the second conveyer pipe is provided with a throttling device, the condenser is also connected with the sewage treatment assembly and the flash tank, the sewage treated by the sewage treatment assembly is purified to form clean water to flow back to the condenser for heat exchange, and then the clean water enters the flash tank to be transformed into steam to enter the steam injection well, wherein the control method of the sewage treatment device comprises the following steps:

pretreating sewage through the stirring mechanism, performing friction extrusion on sewage through the plurality of groups of stirring blades to destroy stability of the first particles of the suspended matters in sewage so that the first particles of the suspended matters are adsorbed with each other to be precipitated;

primarily treating the sewage to remove the organic matters by using a chemical agent;

posttreating the sewage through a multi-stage filter screen to filter the second particles of the suspended matters in the sewage and then purify the sewage to form clean water;

the control method of the sewage treatment device further comprises the following steps:

acquiring the concentration information and the type information of the organic matters in the sewage;

controlling one of the chemical agent control mechanisms connected to a corresponding one of the chemical agent storage bottles to be started according to the type information of the organic matters so as to add the corresponding chemical agent into the chemical purification tank;

controlling power-on time of the electromagnetic block on the corresponding chemical agent control mechanism according to the concentration information of the organic matters so as to add a corresponding amount of the chemical agent into the chemical purification tank;

detecting the liquid level information of the sewage in the purification cavity through the second sensor and then calculating volume of the sewage currently required to be purified;

detecting the type information and the concentration information of the organic matters through the third sensor;

calculating a type and addition amount of the chemical agent required to be added by a data processor on a control system according to the volume of the current sewage, the type information of the organic matters and the concentration information of the organic matters;

controlling the power-on of the electromagnetic block on the corresponding chemical agent storage bottle by the control system so that the corresponding chemical agent is added into the purification cavity; and controlling the addition amount of the chemical agent by controlling the power-on time of the electromagnetic block so that the chemical agent reacts with the organic matters in the sewage to remove the organic matters in sewage.

* * * * *